June 10, 1952  D. J. WARD  2,600,088
MOTOR ANALYZER
Filed Nov. 13, 1945  4 Sheets-Sheet 1

Fig. 1

INVENTOR.
Delbert J Ward

June 10, 1952  D. J. WARD  2,600,088
MOTOR ANALYZER
Filed Nov. 13, 1945  4 Sheets-Sheet 2

INVENTOR.
Delbert J. Ward

June 10, 1952  D. J. WARD  2,600,088
MOTOR ANALYZER
Filed Nov. 13, 1945  4 Sheets-Sheet 3

Fig. 7

INVENTOR.
Delbert J. Ward

June 10, 1952     D. J. WARD     2,600,088
MOTOR ANALYZER Filed Nov. 13, 1945     4 Sheets—Sheet 4

INVENTOR.
Delbert J. Ward

Patented June 10, 1952

2,600,088

UNITED STATES PATENT OFFICE 2,600,088

MOTOR ANALYZER

Delbert J. Ward, Burbank, Calif.

Application November 13, 1945, Serial No. 628,194

4 Claims. (Cl. 175—183)

This invention pertains to means for comparing reactances and more particularly to an apparatus whereby motors and generators may be tested and analyzed by comparing the impedance of one portion with another similar portion.

One object of my invention is to provide a simple means for indicating whether one impedance is greater or less than another.

A further object is the provision of means for indicating the percentage variation between two reactances.

A still further object is to make it possible to read these variations on a suitably calibrated scale.

Another object of my invention is to provide an electronic polarized alternating current galvanometer.

In connection with the last mentioned object, it is a further object to make the responses of such a galvanometer independent of the frequency of the current.

It is a still further object to provide means whereby equal increments near the zero center galvanometer scale will indicate relatively small current variations and equal increments more remote from the zero center will indicate relatively large current variations.

Another object is the provision in an electronic device of a bridge for measuring purposes in which the arms are impedances and/or capacitances.

In testing armatures and stators as they come off the assembly lines at the factory, and in subsequently testing them for repair, various devices have been used; but these generally have merely indicated whether circuits have been complete, or open, or whether "shorts" have been present. Moreover, in the testing of armatures, the contacts have usually had to be made by hand; and in those cases where jigs have been used, the jigs have not been readily adjustable for different sized armatures.

One of the objects of the present invention is the provision of a jig for armature testing in which the necessary contacts are automatically made.

A further object is to make the jig readily adjustable for armatures that vary in total length and diameter and in which the commutators may also be of varying length and diameter.

In addition to making provisions for the more common motor tests, it is a further object of my invention to provide means whereby reversals, transpositions, and shorted turns may be readily detected and located.

A further object of my invention is the provision of means for detecting whether any coil in a given group has more or less than the required number of turns, and if so, which coil is at fault.

Another object is to provide means for readily detecting a non-symmetrical commutator.

Another object is the provision of means for making rapid tests of three-phase stators, either Wye or Delta.

Another object is to provide means for locating the neutral plane or axis of an armature.

A further object is to provide means for measuring the angular position or variation of this plane with respect to at least one of the power brushes.

A further object of my invention is the provision of a superior system for effecting the half-wave rectification of alternating current and delivering stored energy in the same direction as the rectified current during the inactive half-cycle.

Another object is to make it possible in an armature testing device to readily adjust or preadjust the brushes for commutators of any number of segments.

Another object of my invention is to make it possible in a device of the character described to readily test and measure the insulation between coils and the armature or other frame on which they are wound.

A further object of my invention is to provide a brush for certain purposes hereinafter explained that will not simultaneously make contact with two adjoining segments and thus short the coil to which such segments are connected.

For reasons hereinafter given, the non-shorting brush construction, mentioned in the last preceding paragraph, cannot be used for the brushes that feed the power to the armature coils in my device. The consequent shorting of a coil by either of the power brushes disturbs the inductive balance between the coils on the two sides of the central or "balance" brush. It is accordingly another object of my invention to provide means for automatically neutralizing this momentary shorting so that it will not be indicated by my testing apparatus as an actual short.

Still other objects will appear as the specification proceeds.

It has long been common practice to test one or more armature or field coils by placing their terminals, or the commutator segments to which they are attached, across a source of electrical power. Such a test readily indicates an open circuit or a serious "short." Similar tests have been used to locate a grounded coil by manually making appropriate electrical connections to the armature frame and to one commutator segment. Such tests merely indicate whether the circuit is complete. By carrying similar tests a step further, the resistance of the circuit can be measured, and any unusual decrease of resistance may indicate, say, a shorted coil, and any abnormal increase of resistance may indicate that too much wire is somehow distributed in the circuit. Such a test, however, could not possibly indicate the nature of the winding error.

The present invention goes much further than any such method of testing, and is based upon comparing the impedance of one or more coils with that of another coil or coils.

Inasmuch as the awkwardness of holding the armature has contributed to the difficulty and time-consuming nature of armature coil tests, my invention comprises a special jig suitable for holding all armatures within a wide range of sizes. This jig includes means for making all the necessary contacts with the commutator and provides also for various other conveniences that will be discussed in detail as the structure is described.

The jig comprises four main parts: a housing A that supports and encompasses the various brushes, two relatively movable members B1 and B2 that carry mandrels K1 and K2 respectively, and a base D.

In the embodiment that I prefer, the housing comprises a side member E of circular shape at the top and partially supported by an integral depending portion F attached to the base D. Member E has a central hole to permit one end of an armature to pass therethrough when the armature shaft is pivoted on mandrels K1 and K2. A back wall G extends straight up from the rear of the base as far as the circular portion of member E, and its upper part is curved to form a partial cylinder having substantially the same radius as the circular portion of the end member E. The back wall G is transverse to member E, and one edge of the curved portion is attached to the periphery of the circular part of the end piece E. A closure H, having the same radius of curvature as the curved portion of the back wall G, is attached to the upper end of the back wall by hinge J. The free end of the closure is straightened to conform to the outlines of the lower portion F, of member E, and it carries an operating knob 78 having internal threads in screw-threaded engagement with the reduced threaded end of a shank L which is integral with ball 79. When the closure member is in the closed position, the ball 79 is yieldingly held by the resilient detent 104, attached at its center back-portion to the base D.

The mandrel-carrying member B1 is mounted on a carriage N1, which carries two L-shaped pieces $a$ and $b$ that extend around and under the base to serve as ways when the carriage is moved longitudinally of the base. The mandrel-carrying member B2 is similarly mounted on a carriage N2 having two similar L-shaped ways, the forward one of which $b'$ may be seen in Fig. 1. Mandrel K1, adapted to hold one end of a motor armature that is furthest from the commutator, is pressed on otherwise firmly attached to the mandrel-carrying member B1. Mandrel K2 has a reduced shank $e$ that is slidably mounted in the mandrel-support B2. Between the support B2 and the shoulder $d$, Fig. 6, the shank $e$ of mandrel K2 is surrounded by a compression spring 80 to urge this mandrel toward the other. A pin Q extends through the shank $e$ on the side of support B2 opposite from spring 80. An operating handle W, curved substantially as shown, is slotted intermediate its ends to straddle the portion of shank $e$ that lies between pin Q and the mandrel support B2. The lower end of handle W is pivoted on post T, rigidly attached to support B2.

A centrally apertured disc 58, formed of insulating material, is mounted on the inside of end wall E. Two concentric insulating rings 22 and 23 are attached to discs E and 58 by means of screws 24, the heads of which overhang the respective strips in which they are placed. These arcuate strips and screw heads together form ways for slidably mounting two arcuate insulating supports 25 and 26 on opposite sides of the center holes in discs E and 58. Two posts, 27 and 28, are rotatably mounted on arcuate supports 25 and 26 respectively. One end of a bar 29 is rigidly attached to post 27, and another bar 30 is similarly anchored to post 28. Blocks 31 and 32, disposed intermediate the ends of bars 29 and 30 respectively, are integral with these bars. The tapered brush 34 has two holes therein, one of which is threaded. The untapped hole is adapted to receive the free end of bar 29. An adjusting screw 36 is threaded through the other hole in brush 34 and then through a clearance hole in block 31. The end of screw 36 passes through a hole in post 27 that is large enough to clear the threads of the adjusting screw. Nuts 37 and 38, soldered or welded to screw 36, are disposed on opposite sides of post 27 so that the screw is restrained against longitudinal movement while turning. Brush 35 is mounted in the same manner as brush 34, and has an adjusting screw 39 in threaded engagement with the brush, the end of screw 39 being rotatably supported in post 28. Block 32 has a clearance hole therein to assist in holding the screw in place.

Figures 2, 3, 4, 5, 6:
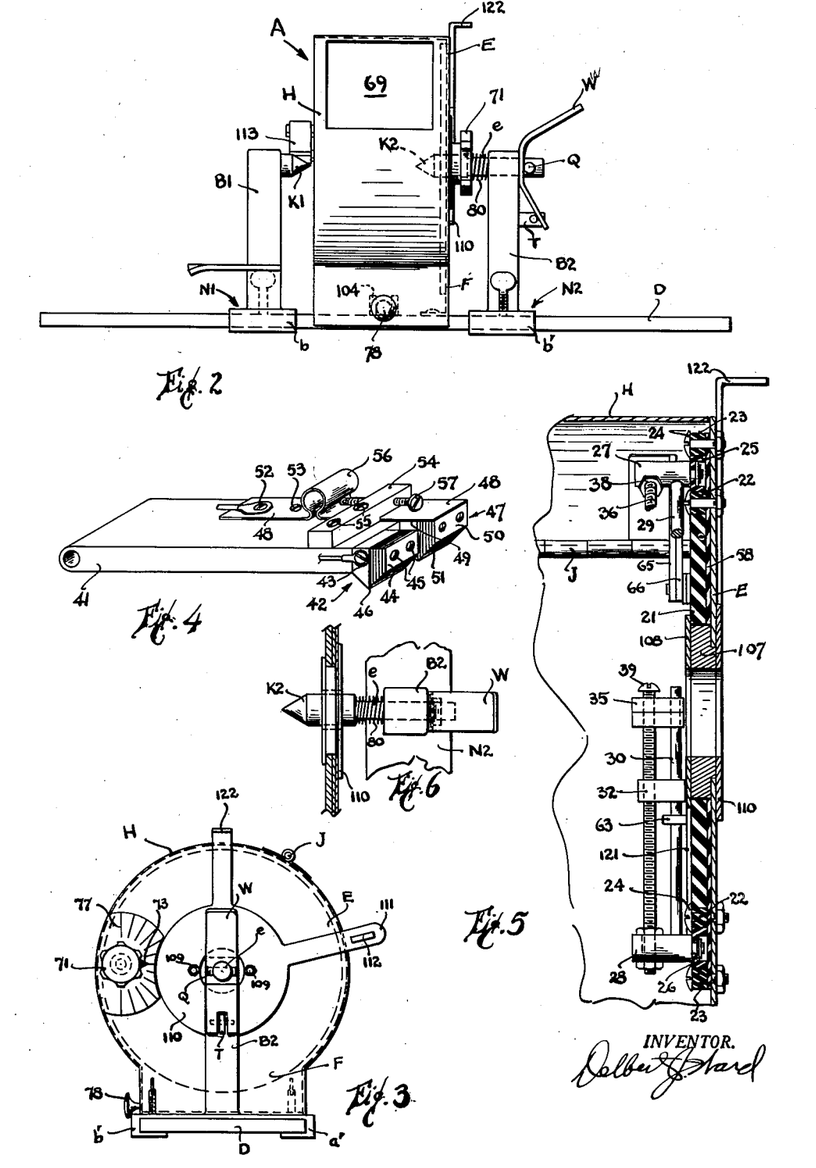
Fig. 2 is a front elevation of the jig.
Fig. 3 is a side elevation of the jig as shown in Fig. 2.
Fig. 4 is a detailed isometric drawing of two of the brushes used in the jig, and of their supporting means.
Fig. 5 is a cross-section taken on line 5—5 of Fig. 1.
Fig. 6 is a plan view that shows the mounting of one of the mandrels that hold the armatures in the jig.

A third post 40 is mounted directly on the insulating disc 58. On this post is pivoted an arm 41 (shown in some detail in Fig. 4) made of Bakelite or other appropriate insulating material. Brush 42 is directly mounted on the end of arm 41 by means of screws 45. Brush 42 is composed of a conducting half 43 and a non-conducting half 44, both terminating in a single knife edge 46 to prevent the shorting of adjoining commutator bars. Another identical brush 47 is attached to a spring member 48, the conducting half 49 being soldered or welded to the spring member and the non-conducting half 50 being screwed to the conducting or metal portion 49. The opposite end of spring 48 is attached to the non-conducting arm 41 by means of screws 52 and 53. Between these screws and brush 47, the spring is provided with a bend or loop substantially as shown in Fig. 4. A block 54, attached by screws 55, extends transversely across arm 41 between the loop 56 and the brushes, the portion above the spring 48 being cut away to permit the free end of the spring to flex as well as to move longitudinally as far back as the loop. An adjusting screw 57 is threaded through block 54 so that the end opposite the screw head bears against the spring. The tendency of loop 56 to expand causes brush 47 to move outwardly whenever screw 57 is loosened, but when it is turned so that it moves longitudinally toward the loop, the brush is caused to move back. Screw 57 thus permits brush 47 to be moved relative to brush 42.

Springs 59, 60 and 61, attached to arms 29, 30 and 41 respectively, are appropriately anchored at their other ends to the non-conducting members 25, 26 and 58 respectively. These springs serve to yieldingly hold the brushes in contact with the commutator of the armature when it is pivoted between mandrels P1 and P2.

Posts 62, 63 and 64 are mounted on the rotatable non-conducting members 25, 26 and 58 respectively. These springs serve to yieldingly hold the brushes in contact with the commutator of the armature when it is pivoted between mandrels P1 and P2.

Posts 62, 63 and 64, mounted on the rotatable non-conducting disc 21, serve to engage arms 29, 30 and 40 respectively and move the brushes away from the commutator as the closure H is raised. This is effected through clockwise rotation of disc 21 to which one end of link 66 is pivoted, the other end of this link being pivoted to bracket 65 attached to the closure H. Whenever the lid is raised, the brushes are thus out of the way, permitting armatures to be placed in the jig and removed without interference.

An armature is placed in the jig in the following manner. First, the operator must make sure that the mandrel-carrying supports B1 and B2 are positioned so that the commutator is disposed in proper relationship to the brushes and so that the distance between the ends of the mandrels K1 and K2 is slightly less than the length of the armature shaft. If the mandrels are not already suitably positioned, they may be moved and re-positioned. This is done by releasing set-screws which normally bear upon the base D and tighten the four L-shaped members against the lower edge of the base. When these screws are loosened, the carriages N1 and N2 may be moved lengthwise of the base, thus permitting the mandrels to be re-positioned and spaced according to the requirements just mentioned. The tightening of the set-screws in carriages N1 and N2 will anchor the carriages in the new positions to which they have been adjusted. It will be assumed for the present that the coils P1 and P2 and their associated structure (later to be described in connection with the circuits) are far enough back to be out of the way of the armature that is to be placed in the jig. While the closure H is in its raised position, the handle W is moved to the right, causing it to bear upon pin Q, thus moving mandrel K2 to the right against the action of spring 80. The armature may then be placed between the mandrels with the centers of the two ends of the armature shaft in engagement with the mandrel points. Upon releasing handle W, spring 80 will urge mandrel K2 toward the left, thus holding the shaft in proper alignment between the two mandrels.

When the closure is lowered, disc 21 turns counter-clockwise, permitting the brushes to move inwardly until they come into contact with the commutator of the armature.

A switch 67, attached to base D, opens and closes one of the circuits (later to be described) that indirectly supplies power to the brushes. Inasmuch as this switch is normally open, the current is always off when the closure H is raised. When the closure is lowered, it engages operating member 68 of switch 67, thus energizing the brushes. In the closed position, the lid H protects the operator from the high voltages, but he nevertheless has easy access to the end of the armature nearest to post B1, to which is attached a support 70 on which he may rest his left hand while slowly turning the armature in order properly to conduct the tests later to be described; and he may watch what he is doing through the window 69 in the closure.

Knob 71, carrying an indicator 73, is keyed to shaft 72, on the other end of which is mounted a disc, or double eccentric, 74. Two links, 75 and 76, are pivoted to this disc at points displaced from the center, and the opposite ends of these links are pivoted respectively to the arcuate members 25 and 26. It will be observed that this mechanism, upon rotation of knob 71, moves brushes 34 and 35 both closer to, or further from, the brushes carried by arm 40. This adjusts the brushes 34 and 35 so that they will be properly positioned for the number of segments in the commutator of the particular armature under test, as indicated on scale 77 with which the pointer 73 cooperates. The nature of the adjustment thus made will be more fully discussed in connection with the circuits.

Figure 7:
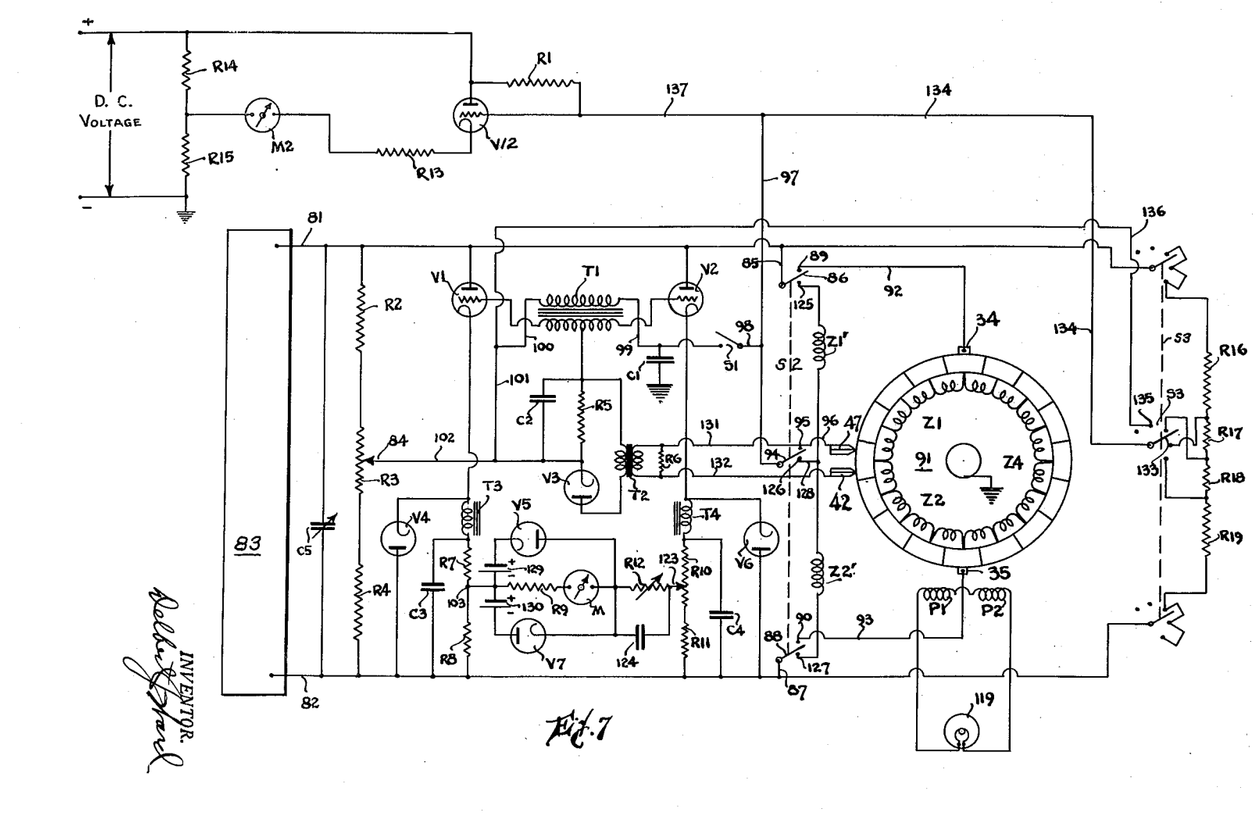
Fig. 7 is a circuit diagram of the instrumentation network.

The jig is connected to an instrumentation network, one form of which is illustrated in Fig. 7. I obtain the voltages to operate the system from a 4000 cycle oscillator and power amplifier having a conventional power supply. This alternating current source 83 is indicated in the left portion of the figure. Conductors 81 and 82 are connected to this current source. Resistors R2, R3 and R4 are connected in series across these conductors in the manner shown, R3 being a variable resistor or potentiometer having a slider 84 which may be adjusted for zero potential in a manner later to be described. These three resistors form one arm of an alternating current bridge. The three pole, double-throw switch S2 is used for connecting into the circuit the impedances that are to form the second arm of the bridge. Blades 86 and 88 are respectively connected to conductors 81 and 82 by wires 85 and 87 respectively. When these blades are on the upper contacts 89 and 90, connection is made by wires 92 and 93 to the power brushes 34 and 35, shown at the right in the electrical diagram and previously referred to in connection with the jig. These brushes bear the same reference numerals as in Fig. 1. The coils on the two sides of the armature 91 (that is, on opposite sides of the power brushes) are in parallel. Otherwise stated, inductance Z1 and Z2 are in parallel with inductance Z4. These impedances, connected across conductors 81 and 82 by switch S2, form the second arm of the bridge.

When the three-pole double-throw switch S2 is in the position described, blade 94 will be on pole 95, thus connecting brush 47 and wire 96 to conductor 97. When switch S1 is closed, the balance arm of the bridge then consists of brush 47, conductor 96, blade 94, conductor 97, switch S1, conductor 99, the primary of transformer T1, and conductors 100, 101 and 102, the latter connecting to the wiper 84 of the variable resistor R3. When the impedances Z1 and Z2 are equal respectively to the impedance offered by the resistances in the first arm on opposite sides of the wiper 84, there will of course be no current in the balance arm of the bridge and transformer T1 will not be energized. If the impedances in the second arm of the bridge do not balance the corresponding impedances in the first arm, current will flow in one direction or other through the balance arm. The resulting current in the primary of transformer T1 will produce a voltage in the secondary, thus placing opposite potentials on the grids of triodes V1 and V2. These two triodes rectify the current in two circuits connected in parallel across the main conductors 81 and 82. The first circuit includes the triode V1, a filter which comprises choke T3 and condenser C3, and the resistors R7 and R8; and the second circuit includes triode V2, the filter consisting of choke T4 and condenser C4, and the resistors R10 and R11. These circuits might be considered the first and second arms of a second bridge.

Because of the high inductance of the chokes T3 and T4, very little current flows through them. I therefore connect diode V4 from conductor 82 to a point between choke T3 and triode V1, these valves being arranged so that their directions of conductivity are opposed. As a result, the energy stored in choke T3 passes through diode V4 during the half-cycle when triode V1 is non-conductive. This current reaches point 103 through resistor R8. In the second arm of the second bridge, diode V6 is connected across choke T4 and condenser C4, the connection on one side being made direct to the main conductor 82. This diode is conductive on the half cycle when triode V2 is non-conductive, and, like diode V4, it permits the energy in its associated choke to be discharged around the choke and through resistor R11 and part of resistor R10 to slider 123. Diodes, rather than condensers, are employed to bypass these chokes, because we are dealing with an integration of the entire half cycle wave instead of merely with the peak, as would be the case if condensers were used instead of valves.

Resistor R9, the zero-center D. C. galvanometer M, and resistor R12 form the balance arm of this second bridge, and slider 123 is adjusted so that there is no current in either direction through the meter when transformer T1 is not energized—that is, when there is no current through the balance arm of the first bridge. Resistor R12 is variable to provide a compensation adjustment for the A. C. voltage applied to the network, and permits the meter M to function properly irrespective of the applied voltage. Resistor R12 is shunted by condenser 124 to eliminate spurious A. C. pickup in the wiring of the various components. The use of diodes V4 and V6, rather than condensers, enables the galvanometer M to respond to a condition more nearly approaching the average voltage of the half cycle than would be the case if condensers were employed.

The remainder of the network will be better understood if we first explain the functioning of the circuits and components already mentioned. Let us suppose that we throw the three-pole, double-throw switch so that blades 86, 94 and 88 respectively engage contacts 125, 126 and 127, and that these contacts have been connected to impedances Z1' and Z2' whose values are to be compared. These impedances now form the second arm of the first bridge previously described, and the balance arm consists of conductor 128, contact 126, blade 94, conductors 97 and 98, switch S1, conductor 99, the primary of transformer T1, and conductors 100, 101 and 102. If the voltage drop across each of the impedances Z1' and Z2' is equal respectively to the voltage drop across resistors R2 and R4, there will of course be no current through transformer T1 and the grids of the triodes V1 and V2 will have the same potential; but if impedances Z1' and Z2' are not of equal value, the phase of the current flowing through the primary of transformer T1 will depend upon which impedance is the greater. The grids of the triodes will thus have opposite potentials whose difference will vary with the extent of variation in the values of the impedances Z1' and Z2'. This will result in the presence of unequal D. C. voltages on condensers C3 and C4 and at point 103 and wiper 123, the relative polarity of which will be indicated on meter M in the balance arm of the second bridge.

If either impedance Z1' or Z2' is very much greater than the other, or if a short occurs across one of the two elements in this second arm of the first bridge, the resulting difference of potential on the grids of the triodes might be great enough to produce a sufficiently excessive current through the meter M to injure the meter movement. Biased diodes V5 and V7, connected in reverse parallel across the meter and resistor 9, provide a means for preventing such injury and also afford a means whereby a given angular movement of the galvanometer needle near the zero center of the galvanometer scale will represent a smaller current variation than the same angular movement near the outer ends of the scale. Diodes V5 and V7 are biased respectively by batteries 129 and 130, either or both of which could equally well be placed on the opposite side of the associated diode. When the IR drop through the resistor R9 and the meter M exceeds the algebraic sum of the bias voltage and the cathode emission voltage of the diode V5 or V7, whichever is of correct polarity, a portion of the current flowing through resistor R12 is bypassed around the meter, thereby changing its sensitivity as an indicator of the total current flowing through this resistor. The bias voltages may be adjusted so that the sensitivity changes at any desired point. In the first model built, this was adjusted so that 50% of the scale on either side of zero represented a 15% unbalance in the impedances under test, while the remaining 85% of a 100% unbalance was represented by the remainder of the two sides of the scale. The biased diodes thus conduct a small amount of a weak current but carry the greater portion of a strong current.

Diodes V4 and V7 are encased in the same envelope and diodes V5 and V6 in another. The reason for this will be apparent if we examine the situation that would prevail if the filament for diode V4 or V6 should burn out. Should the filament for diode V4, for example, burn out, the current through the circuit of which it is a part would be very materially reduced, because the action of choke T3 would permit very little current to pass through. This would unbalance the bridge, resulting in sufficient current through resistor R12 to injure the movement of galvanometer M if the biased valve V5 were not there to protect it. Since both the diodes that are in the same envelope have a common filament, serious injury to the galvanometer would thus occur if diode V5 had the same filament as diode V4. If diodes V4 and V7, however, are in the same envelope, no harmful situation can arise, because the loss of their common filament makes diode V4 non-conductive, thus making the potential so low at point 103 that no current would flow through the galvanometer system in the direction in which diode V7 is conductive. If the diodes were in individual envelopes, the loss of either diode V5 or V7 would leave the galvanometer without protection from excessive currents in one direction, but when each of these diodes is paired in a common envelope with the diode through which such excessive current would have to pass, the simultaneous loss of both diodes avoids the excessive currents to which the biased diode of the pair would ordinarily respond.

When an armature is in the jig, knob 71 must of course be adjusted so that indicator 73 is on the line bearing the numeral corresponding to the number of segments on the commutator, as hereinbefore explained. When the armature is so positioned that brushes 42 and 47 are on the same commutator segment, the power-supplying brushes will then each be on a single segment, as shown at the right of Fig. 7, and the same number of coils will be in circuit between each power brush and brushes 42 and 47. The impedances of Z1 and Z2 may then be compared if switch S2 is thrown so that its three blades are on contacts 89, 95 and 90. If the indicator of meter M remains near zero center, indicating a substantial balance, there is nothing wrong with the functioning of the armature when the power brushes are on the segments then being contacted. The meter reading can be observed in so short a fraction of a second that it is not necessary for the operator to stop turning the armature.

Figure 8:
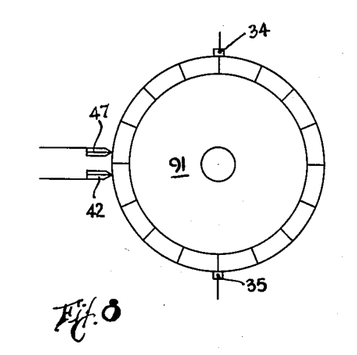
Fig. 8 is a diagram of a commutator oriented differently with respect to the brushes of my device than in Fig. 7.

During commutation, however, an unbalance would momentarily occur that would mislead the operator if my instrument did not embody means to prevent it. This unbalance would be caused by the shorting of a coil that takes place whenever one of the power brushes is in contact with adjoining segments at the same time. If both power brushes shorted at exactly the same instant, the loss of the impedance of one coil on one side would be offset by the simultaneous loss of the impedance of another coil on the opposite side. Manufacturing inaccuracies, however, prevent simultaneous commutation from occurring with sufficient regularity for such neutralization to be depended upon. My invention therefore provides means for suppressing all indication of any imbalance while either or both brushes are over a commutator slot. As indicated in Fig. 8, brushes 42 and 47 are so arranged that they are on different segments when commutation is occurring at the power brushes 34 and 35. Brushes 42 and 47 are thus in circuit with one of the armature coils during this interval, and the voltage that they pick up is transferred to the primary of transformer T2 through conductors 131 and 132 to which these brushes are attached. This voltage is transformed to a high voltage by transformer T2 and rectified by diode V3. Since one end of the secondary of transformer T2 is connected to the mid-point of the secondary of transformer T1, a high negative bias is consequently given to the grids of triodes V1 and V2, thus suppressing any current to the metering circuit, with the result that the galvanometer gives no indication during the commutation period. The commutator may therefore be slowly rotated and the galvanometer will register only those imbalances that are present when the brushes and the commutator segments are in such relative positions as those illustrated in Fig. 7.

It is not practical to attempt to avoid the shorting of coils by the brushes 34 and 35 during commutation by constructing these brushes like brushes 42 and 47. Since the power is supplied by brushes 34 and 35, destructive sparking would occur if the knife-edge construction were used, and the knife edge could not be maintained. Even if this construction could be used to prevent shorting by the power brushes, it could not be used for yet another reason. While passing over the non-conducting gap between segments, there would be intervals when the conducting side of the brush would make contact with neither segment, and an open circuit would thus be indicated by the galvanometer.

The condenser C5, connected across conductors 81 and 82, is provided to compensate for the inductive load of the armature coils or other impedances under test, thus eliminating the inductance lag and reflecting a unity power factor load to the alternating current source.

A calibrating network, shown at the extreme right of Fig. 7, is provided to facilitate the determination of the alternating current mid potential referred to slider 84, or the direct current mid potential at point 103 and at the slider 123. A plus and minus 10% unbalance tap is also provided to check the calibration of the special scale associated with galvanometer M. This calibrating network is controlled by a three-pole, five-way switch S3. When the blades of this switch are on the taps located furthest to the left, the calibrating network is entirely out of the circuit.

The center blade or wiper 133 of switch S3 is connected to conductor 134 which makes connection with one end of the balance arm of the alternating current bridge through conductors 97 and 98 and switch S1. When switch S3 is turned to its second position from the left, blade 133 engages contact 135, thus making electrical connection with conductor 136 which connects with the opposite end of the balance arm, thus shorting the primary of transformer T1. This removes the possibility of there being any unequal currents through the triodes and permits the galvanometer M to be adjusted to zero position with respect to the D. C. bridge network in the full assurance that no current is passing through it.

When switch S3 is in its central position while the blades of switch S2 are out of engagement with their respective contacts, it will be clear that resistors R16, R17, R18 and R19 are connected to form the second arm of the alternating current bridge across conductors 81 and 82. The resistors R16 and R17 of course form one element of the arm and resistors R18 and R19 the other. The connection that switch S3 thus makes, enables the adjustment of wiper 84 to be checked for the A. C. mid potential.

When the switch S3 is in its fourth position from the left, resistor R16 will be alone on one side of the balance arm, and the impedance of resistor R17 will be added to the other side. The value of resistor R17 is such that this shift creates a 10% unbalance in one direction, thus enabling the operator to check the calibration of the dial of galvanometer M. When switch S4 is in its fifth position from the left, which is also the extreme position to the right, R19 will be alone on one side of the balance arm and the impedance of resistor R18 will be added to the side opposite that on which it normally belongs. This creates a 10% unbalance in the direction opposite from that created when the switch is in its fourth position, and the calibration of the galvanometer dial may thus be checked on the side opposite the one previously checked.

As set forth in the objects, the jig and instrumentation network herein described may be used for a variety of tests. Let us consider how various armature faults are indicated by portions of the jig and instrumentation network that have already been described.

Figure 1:
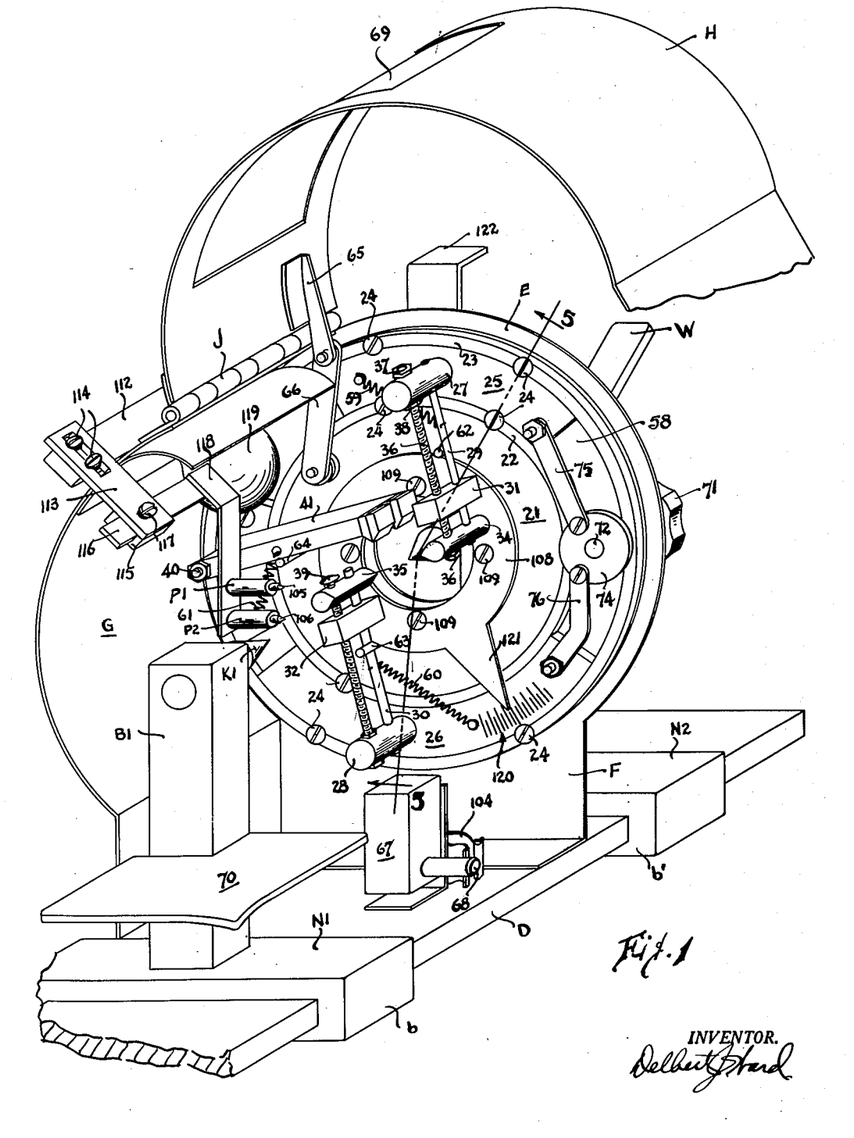
Fig. 1 is an isometric drawing of the jig in which motor armatures are placed for testing.

The armature is placed in the jig in the manner previously described, and the lowering of the closure H causes the brushes to make contact with the commutator and closes the switch 67, causing the power brushes to receive their respective potentials. If dial 71 has been properly adjusted to bring the indicator 73 into alignment with the number on the scale 77 that corresponds to the number of segments on the commutator, there will be the same number of commutator gaps in the quadrant between the power brush 35 and the two brushes 42 and 47 that there are in the quadrant between the power brush 34 and the brushes 42 and 47. These quadrants will hereinafter be referred to as the first and second quadrants respectively. If the number of commutator segments is a multiple of four, the adjustment of dial 71 will dispose the power brushes diametrically opposite each other, both equally distant from a line midway between the brushes 42 and 47. This condition is illustrated in Fig. 1. When the number of commutator segments is not a multiple of four, it will readily be understood that the power brushes cannot be disposed exactly 180 degrees apart and still keep the same number of commutator gaps in the first and second quadrants in order that the same number of coils might be in circuit to form the two elements of the bridge arm. The power brushes must therefore both be moved closer to or further from the center brushes 42 and 47; but whatever the number of commutator segments may be, the proper adjustment of dial 71 will arrange the brushes 34 and 35 so that there will be the same number of commutator gaps in the first and second quadrants. As a consequence, the same number of armature coils will be in circuit in these two quadrants, providing there are no electrical or mechanical defects in the armature. Such defects are among those automatically indicated by the device.

If the galvanometer M shows no appreciable deflection from the zero center as the operator rotates the armature with his left hand (leaving his right hand free to operate the various controls), the impedances Z2 and Z1, Fig. 7, corresponding to the coils in the first and second quadrants respectively, are substantially equal. If the galvanometer shows a material deflection in either direction, the trouble may be an open, shorted or reversed coil, a transposed connection, an excessive winding error, a non-symmetrical commutator or defective insulation.

An open coil will cause the balance indicator M to deflect 100% to the right-hand side during the time the open coil remains in the first quadrant unless the open wire is arcing over, in which case the location will be self-evident. When the open coil moves to the second quadrant, the galvanometer will immediately shift to a 100% left-hand deflection. Consequently, the exact coil which has the open circuit can be located by observing which commutator bar passes the balance brush when the deflection reverses its direction.

Inasmuch as the device is powered by high-frequency A. C., a shorted turn will act as a transformer with a short-circuited secondary which reflects a low impedance into the primary. In the analysis, this impedance will generally represent an unbalance of between 50% and 100%, and the indicator will deflect to the left when the short is in the first quadrant and shift to the right when the short transfers to the second quadrant. The exact coil having the error is thereby located.

The impedance effect of one reversed coil in an armature is the equivalent of the omission of two coils, inasmuch as the flux of the reversed coil cancels the flux of an adjacent coil. Consequently, if the operator were testing a 32-coil armature which had one coil reversed, the impedance of the quadrant in which it happened to be positioned would be the impedance of only 6 coils, whereas the impedance of the other quadrant would be that of 8 coils. It may be noted that almost all reverses of a single coil will reflect an unbalance somewhere between approximately 20% and 50%. The reversed coil may be located as it moves from one quadrant to the other.

If two pairs of wires in a continuously wound armature have been reversed, one coil will be added or subtracted from the first quadrant as one of the commutator bars connected to the transposed wires contacts brush 35, and as the second bar connected to the transposed wires contacts this brush, the opposite condition is indicated. After the two segments have cleared brush 35, no further effect will be noticed until the same bars cross the balance brush 47. The effect then will be that of first adding one coil to one quadrant and subtracting it from the other, and then to reverse this condition with the next commutator bar. After the two segments have cleared the balance brush, no unbalance will again be noted until the two segments cause the same deflection first in one direction and then in the other as they pass under brush 34 and leave the second quadrant. It will thus be noted that for each revolution of the armature, three positions will be found at which the balance indicator deflects first in one direction and then in the other. All three of these will take place in the first and second quadrants, and none will occur elsewhere.

To determine errors in the number of turns wound into the coils of the armature, the instrument is especially provided with high sensitivity in the region immediately adjacent to, and on both sides of, the center zero. It is possible to read an impedance unbalance of one-half of one per cent. However, it is not normally deemed necessary to reject coils for less than 4 to 10% unbalance.

If the commutator on the armature is non-symmetrical to the extent that the distance between one of the power brushes and the balance brush varies more than the distance between the balance brush and the commutation suppression brush, there will be a deflection of the galvanometer at each point of commutation of a power brush from one segment to the next. However, this dancing deflection will continue to be in one direction as the armature is rotated from bar to bar, then the deflection will cease for about one quarter of a revolution and will begin again in the opposite direction. There will be no immediate change in the direction of deflection as a single commutator bar passes from one quadrant to the other. The distance between the balance brush 47 and the commutation suppression brush 42 may be adjusted to make the instrument give these indications of non-symmetry for any amount below one-half the width of a commutator bar.

The portion of the network in the upper left hand corner of Fig. 7, affords the means for a very sensitive insulation test. When switch S2 is turned so that the center blade 94 is on contact 95, the grid of triode V12 is connected to the balance brush 47 through wires 137 and 97, blade 94, contact 95 and wire 96. The armature shaft or frame is grounded by means of the jig, as indicated in Fig. 7, and it will be noted that the negative side of the D. C. voltage supply is also grounded. Resistors R14 and R15 are connected in series across the D. C. voltage supply wires, and the meter M2 and resistor R13 are connected in series between the cathode of tube V12 and a point between resistors R14 and R15. When there is an infinite insulation resistance between the frame of the armature and the coils or commutator segments, the grid potential will be due solely to the voltage drop across resistor R1. There will thus be a low voltage drop through the tube and a proportionately high voltage drop through resistor R13 and the meter, which consequently gives a full-scale deflection. If there is a finite insulation resistance to ground, the positive potential on the grid of tube V12 will drop, thereby increasing the resistance through the tube and decreasing the meter deflection. When such an indication occurs, the exact location of the insulation break-down can be determined by opening switch S1, thus making connection through the ground and condenser C1 to the balance arm of the A. C. bridge. The deflection of the galvanometer M1 will be to the left if the grounded coil or segment is in the first quadrant, and to the right if it is in the second quadrant. The direction of deflection will change as the grounded coil or segment passes from one quadrant to the other.

When stators, fields or other such impedances are to be tested, the coils may be compared by connecting one lead from one coil to contact 125 of switch S2, connecting one lead from the other coil to contact 127 of this switch, connecting the other leads of the two coils both to contact 126, and throwing the switch so that these contacts are in circuit. Shorts, open circuits and winding errors are then indicated by the galvanometer in the same manner as for armature coils.

If the coils are connected in the fashion just described, the meters M and M2 will give the usual insulation and ground indications when the pairs under test are placed upon a grounded metal plate so that their frames or cores make contact with the metal.

The coils P1 and P2, Fig. 7, which locate the neutral plane of an armature, are disposed on opposite sides of the power brush 35, and may be adjusted by means of the structure shown in Figs. 1, 2, 3 and 5, so that the points of their cores 105 and 106 come into close proximity with the armature core. Inasmuch as such armature cores are of various diameters and vary in their distances from the commutator, provisions must be made for adjusting coils P1 and P2 radially (that is, toward or from the main axis of the jig) as well as longitudinally. Other purposes, later to be explained, require that they also be angularly adjustable. The structure that makes the radial, longitudinal and angular adjustments possible will now be explained.

A short cylindrical member 107, rotatably mounted in the central holes in members E and 58, has a flange 108 attached to the end inside the jig by screws 109. A relatively large flat ring 110 is similarly affixed to the opposite end of member 107. A radial projection 111 integral with ring 110 carries an axially extending bar 112. A slotted member 113 is transversely mounted on bar 112 in such a manner that it may be moved radially and fixed in adjusted position by means of screws 114. A block 115 is rigidly attached to the under side of the lower end of member 113. This block is slotted to receive an axially movable bar 116, and a set screw 117 serves to hold bar 116 in adjusted position. A bracket 118 is welded or otherwise rigidly attached to bar 116. This bracket 118 carries the two coils P1 and P2 with their pointed pole pieces 105 and 106. These coils and pole pieces may be moved axially along the armature by the longitudinal adjustment of member 116, and they may be adjusted toward or away from the armature by means of bar 113 and the screws 114.

Inasmuch as the current in the armature coils on opposite sides of brush 35 flow in opposite directions, the magnetic flux cutting coils P1 and P2 will also be in opposite directions and will therefore generate opposing currents in these coils. If the flux is equal through both coils, the opposing currents will neutralize each other, with the result that lamp 119 will not light. When the coils are so adjusted with respect to the armature that the lamp does not light, the neutral plane of the armature passes midway between the coils. If the armature has the proper symmetry and the coils are properly wound, the neutral plane will pass through the power brush 35. The location of the neutral plane should therefore be determined with respect to this power brush, and either the calibrated scale or the indicator must consequently be located on, or movable with, the arcuate segment on which the power brush is carried—that is, segment 26. In practice, I place the calibrated scale 120 on this segment and make the pointer 121 integral with flange 108. The scale is so calibrated that when points 105 and 106 are equally distant from power brush 35, the pointer will be on zero. If the lamp 119 lights when the pointer is so positioned, the neutral plane is not in a symmetrical position. The actual position of the neutral plane may then be located by moving handle 122, attached to member 110, either clockwise or counter-clockwise, until the lamp goes out. The pointer 121 will then indicate on scale 120 the number of degrees that the neutral plane has shifted either to the right or left of its symmetrical position.

Figure 9:
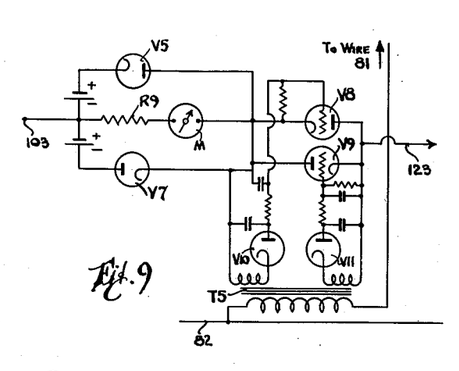
Fig. 9 shows a modification of a portion of the circuits shown in Fig. 7.

An explanation of Fig. 9, which shows modifications applicable to the network of Fig. 7, requires that we examine certain phases of the operation of the said network. When the potentials on the grids of triodes V1 and V2 (Fig. 7) are equal, due to an absence of current through transformer T1, it will readily be understood that an increase of voltage across conductors 81 and 82 will result in an equal increase of current through the two triodes. In such a situation, the increase in supply voltage will therefore not unbalance the direct current bridge that includes the galvanometer M. But if there is an imbalance in the coils being tested, the resulting current through transformer T1 will place unequal potentials on the grids of tubes V1 and V2, and although these unequal grid potentials will of course not change in relative values when the supply voltage is increased, they will produce a greater variation in the current flowing through the two tubes at the increased voltage than at the lower. For a given percentage imbalance through the balance arm that includes the primary of transformer T1, there will thus be a greater current through the galvanometer M with a high supply voltage than with a low supply voltage. In the network as shown in Fig. 7, resistor R12 is made variable to compensate for the effects of such changes in the supply voltage. Fig. 9 shows an arrangement whereby these changes are automatically compensated for. This diagram shows the metering or balance arm of the second bridge—that is, the direct current bridge—and points 103 and slider 123 are those having the corresponding numbers in Fig. 7. In following the explanation of this circuit, it is to be remembered that all parts of the network may be identical to those shown in Fig. 7 excepting for the changes shown in Fig. 9. The primary of transformer T5 is connected across the conductors 81 and 82 carrying the A. C. voltage supply. An increase in this voltage increases the voltages in the secondaries of this transformer, producing a correspondingly increased negative potential on the grids of triodes V8 and V9. This in turn increases the resistance through these tubes to compensate for the increase in supply voltage. When the current in the balance arm between point 103 and slider 123 is in one direction, it is conducted through one of these tubes, and when it is in the opposite direction, it is conducted through the other. The four condensers shown assist in filtering.

Figures 10, 11:
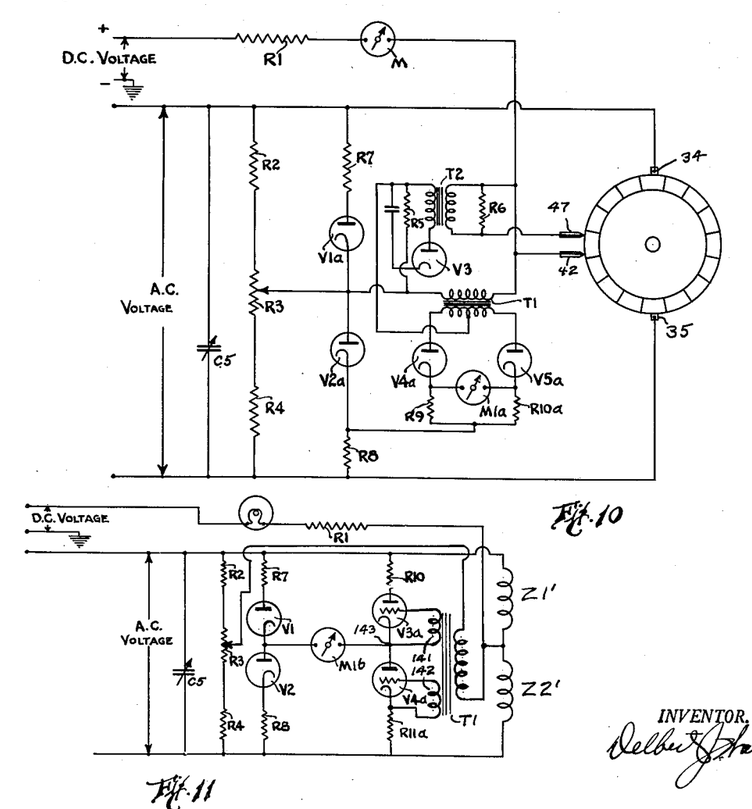
Fig. 10 is a diagram of an alternative circuit that may be used with my jig, or for other impedance comparisons.
Fig. 11 shows another alternative circuit.

Fig. 10 shows a modified network for accomplishing the same over-all polarized indication achieved by the network of Fig. 7. In this system, the ground insulation is indicated directly on the ohmmeter M2a. The A. C. balance arm is substantially the same as in the circuit of Fig. 7, the primary of transformer T1 being connected from the balance brush 42 to the A. C. midpoint 84, which is at the same potential as the cathode and plate respectively of the rectifying diodes V1a and V2a. When there is no imbalance current in the transformer T1, any current that may be flowing through diodes V4a and V5a and their associated resistors will be equal; but when the primary of T1 impresses an imbalance current on the secondary, then the potentials on the plates of valves V4a and V5a will change in accordance with the direction of the imbalance current, and the current through these valves will also change accordingly. The cathodes of these tubes will have potentials that vary according to the respective voltages applied to the plates of these tubes and the direction and amount of deflection of the indicator of galvanometer M1a will correspond to the relative values of these potentials, thus giving an indication of the imbalance of the two impedances under test.

Fig. 11 shows another modified network embodying my invention and achieving the same over-all result as the networks of Figs. 7 and 10. In this circuit, the primary of transformer T1 that carries the imbalance current is coupled inductively to two secondaries 141 and 142, to which the grids of triodes V3a and V4a are connected. When there is no current in either direction through the primary of transformer T1, there is no difference of potential on these grids, but when transformer T1 is energized by an imbalance current, the grid potentials change according to the direction and degree of imbalance. The resulting change in resistance through tubes V3a and V4a changes the D. C. mid potential at point 143, and current flows through the galvanometer M1b in accordance with the direction and strength of the imbalance current, thus giving a visual indication on the scale of the imbalance of the impedances under test.

My invention may be embodied in many other forms, the jig and networks shown being only representative embodiments. Various modifications, omissions, additions and transpositions may be made from the illustrative embodiments shown and described without departing from the broad spirit of my invention as set forth in the appended claims.

My claims are:

1. In a device for comparing impedances, a combination including: first and second conductors connected to an alternating current source; impedances connected across said conductors for forming a first branch of a Wheatstone type bridge; means whereby two impedances that are to be compared may be connected in series so that the said two impedances form the two ratio arms of a second branch of said bridge; an electrical path from a point intermediate the said two impedances to a predetermined reference point in said first branch; and a polarized, alternating current galvanometer system comprising (a) first and second branches of a second Wheatstone type bridge connected across said conductors, each of said branches of said second bridge comprising a first arm including a triode and a filtering system and a second arm comprising a resistor, (b) a polarized direct current galvanometer having one side connected to a point between the arms of one branch of said second bridge and the conjugate point of the other branch of said second bridge, and (c) means responsive to a voltage imbalance across said electrical path for impressing opposite voltages upon the grids of said triodes to render the first arms of the two branches of said second bridge unequally conductive, thereby causing the galvanometer to indicate the magnitude and direction of said voltage imbalance across said electrical path.

2. In a device for comparing impedances, a combination including: an alternating current source; impedances connected across said source to form a first branch of a first Wheatstone type bridge; means whereby the two impedances that are to be compared may be connected in series across said source to form the ratio arms of a second branch of said first bridge; an electrical path from a point intermediate the said ratio arms and a predetermined reference point in said first branch; a second Wheatstone type bridge each branch of which has a first arm comprising a triode and a filtering system and a second arm comprising a resistor, the balance arm of said second bridge comprising a polarized direct current galvanometer; two electronic rectifiers connected across said galvanometer so that they are conductive in opposite directions; means for biasing said rectifiers so that equal increments near the zero center of the galvanometer scale represent small current variations and equal increments remote from said zero center represent relatively large current variations; and means responsive to a voltage imbalance across said electrical path for impressing opposite voltages upon the grids of said triodes to render the first arms of the two branches of said second bridge unequally conductive, thereby causing the galvanometer to indicate the magnitude and direction of said voltage imbalance across said electrical path.

3. In a device for comparing impedances, a combination including: an alternating current source; impedances connected across said source to form a first branch of a Wheatstone type alternating current bridge; means whereby two impedances that are to be compared may be connected in series to form respectively the two ratio arms of the second branch of said alternating current bridge; an electrical path from a predetermined reference point in the first branch of said bridge and a point intermediate the said ratio arms; a Wheatstone type direct current bridge, each branch of said bridge having (1) a first arm comprising (a) a triode and (b) a filtering system that includes an impedance and a diode, said diode so arranged with respect to said triode that the energy stored in the choke will pass through the diode during the half-cycle when the triode is non-conductive, and (2) a second arm comprising a resistor; the balance arm of said direct current bridge comprising a polarized galvanometer; and means responsive to a voltage imbalance across said electrical path for impressing opposite voltages upon the grids of said triodes to render the first arms of the two branches of said direct current bridge unequally conductive, thereby causing the galvanometer to indicate the magnitude and direction of said voltage imbalance across said electrical path.

4. In a device for comparing impedances, a combination including: an alternating current source; a Wheatstone type alternating current bridge connected across said source; means whereby two impedances that are to be compared may be connected in series to form respectively the two ratio arms of one branch of said alternating current bridge; a transformer having its primary connected so as to form the balance arm of said alternating current bridge; a Wheatstone-type direct current bridge connected across said source, said direct-current bridge having a triode in corresponding arms of each of its branches; the balance arm of said direct current bridge comprising a polarized galvanometer; the secondary of said transformer connected to the grids of said triodes, said secondary acting in response to a voltage imbalance in said primary to impress opposite voltages upon the grids of said triodes to render said corresponding arms unequally conductive, thereby causing the galvanometer to indicate the magnitude and direction of the voltage imbalance in said primary.

DELBERT J. WARD.

REFERENCES CITED

The following references are of record in the file of this patent:

UNITED STATES PATENTS

| Number | Name | Date |
|---|---|---|
| 879,061 | Pierce | Feb. 11, 1908 |
| 1,316,244 | Kemble | Sept. 16, 1919 |
| 1,358,179 | Schweitzer | Nov. 9, 1920 |
| 1,432,003 | West | Oct. 17, 1922 |
| 1,496,786 | Shackelton | June 10, 1924 |
| 1,825,514 | Fitzgerald | Sept. 29, 1931 |
| 2,006,806 | Hagen | July 2, 1935 |
| 2,135,587 | Lovelady | Nov. 8, 1938 |
| 2,360,618 | Pash | Oct. 17, 1944 |
| 2,394,892 | Brown | Feb. 12, 1946 |

OTHER REFERENCES

General Electric Review, May 1941, pages 263–266.